United States Patent [19]
Morgan et al.

[11] Patent Number: 5,856,745
[45] Date of Patent: Jan. 5, 1999

[54] HYDRAULIC CYLINDER END MEMBER ARRANGEMENT FOR A PISTON POSITION SENSING SYSTEM

[75] Inventors: Dennis E. Morgan, San Diego; Jerry Collum, Poway, both of Calif.

[73] Assignee: Caterpillar Inc., Peoria, Ill.

[21] Appl. No.: 801,705

[22] Filed: Feb. 14, 1997

Related U.S. Application Data

[60] Provisional application No. 60/034,825 Dec. 19, 1996.

[51] Int. Cl.⁶ .................. G01R 33/32; G01R 27/32
[52] U.S. Cl. ........................ 324/635; 324/633; 91/1; 92/5 R
[58] Field of Search .................. 324/633, 635, 324/636, 208; 73/116, 119 A; 91/1, 189 R, 361, 459; 92/5 R; 361/818, 816

[56] References Cited

U.S. PATENT DOCUMENTS

| | | | |
|---|---|---|---|
| 4,737,705 | 4/1988 | Bitar et al. | 324/635 |
| 4,875,009 | 10/1989 | Leveque | 324/208 |
| 5,150,060 | 9/1992 | Bitar | 324/635 |
| 5,182,979 | 2/1993 | Morgan | 92/5 R |
| 5,241,278 | 8/1993 | Bitar | 324/635 |
| 5,325,063 | 6/1994 | Morgan | 324/636 |
| 5,438,274 | 8/1995 | Bitar et al. | 324/636 |
| 5,471,147 | 11/1995 | Allen et al. | 324/635 |
| 5,608,332 | 3/1997 | Crayron et al. | 324/633 |
| 5,617,034 | 4/1997 | Lark et al. | 324/635 |
| 5,710,514 | 1/1998 | Crayton et al. | 324/635 |
| 5,724,234 | 3/1998 | Phelps | 361/816 |

*Primary Examiner*—Diep N. Do
*Attorney, Agent, or Firm*—Steven G.. Kibby

[57] ABSTRACT

A piston position sensing system with improved accuracy and reliability is achieved by electromagnetic wave coupling using the combination of: a mechanical structure that in addition to supporting the rod, provides an extension of the resonance cavity, supports the electromagnetic wave couplers and a hydraulic fluid input-output port into the extended cavity and a piston travel stop; an electronic circuitry shielded package having a high frequency section with coaxial shielded input and output conductors on opposing package sides and a lower frequency counting section having a piston position output shielded conductor and a fluid dielectric property change monitor input conductor separated from the high frequency section conductors; and, the positioning of the electronic package on the mechanical structure with the coaxial shielded input and output conductors respectively adjacent to the input and output couplers and with the hydraulic fluid input-output port positioned elsewhere around the periphery of the cylinder. The structure assures minimal high frequency conductor length, with electrical and physical damage.

13 Claims, 3 Drawing Sheets

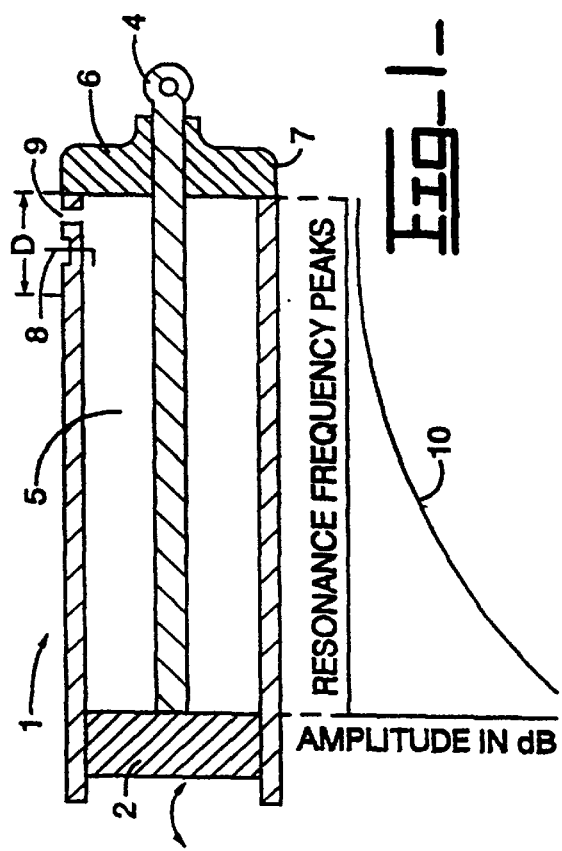
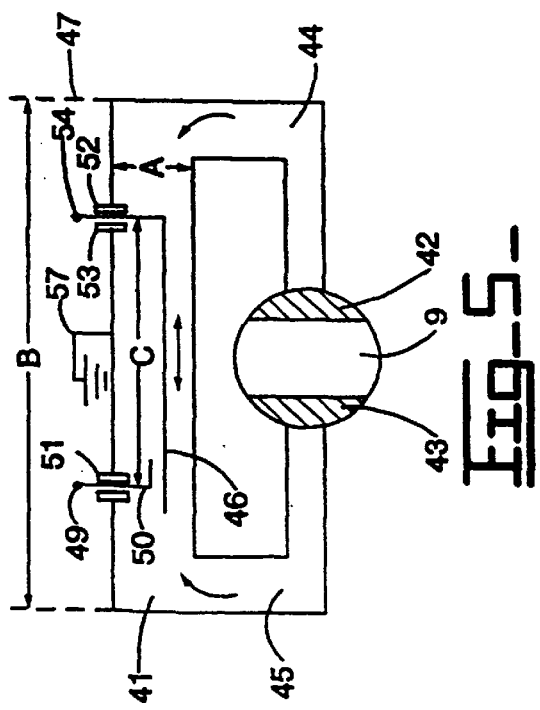
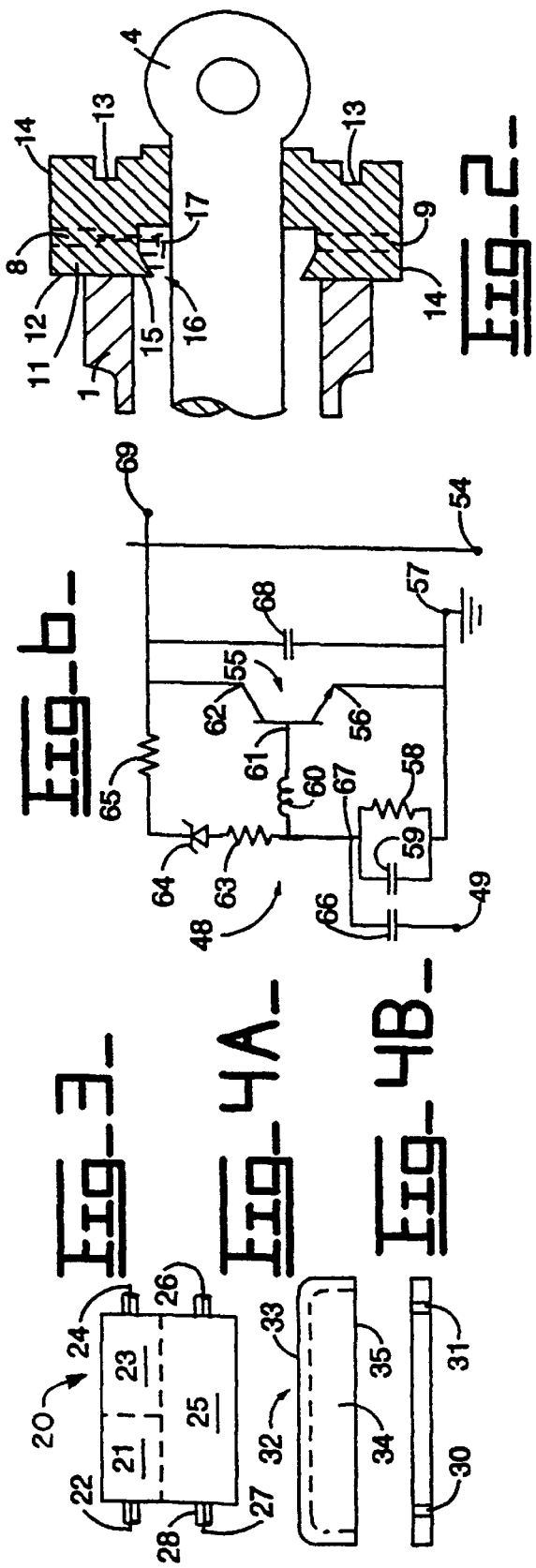

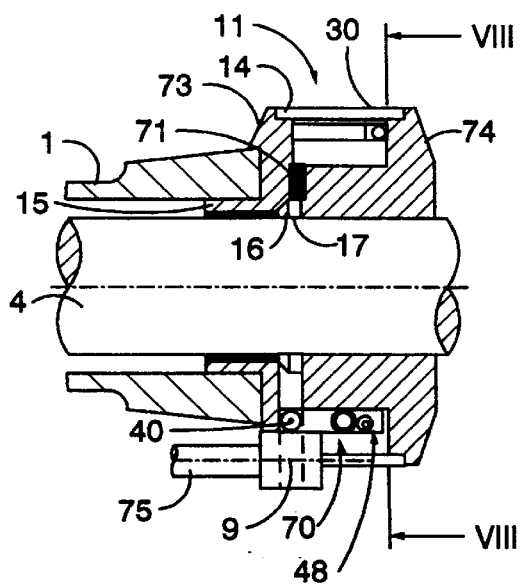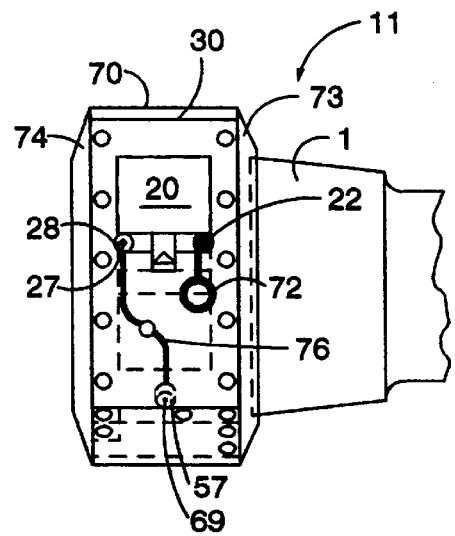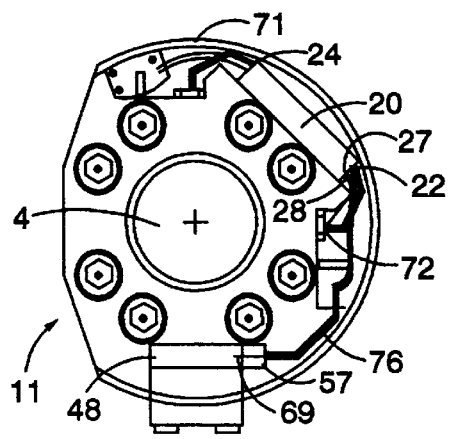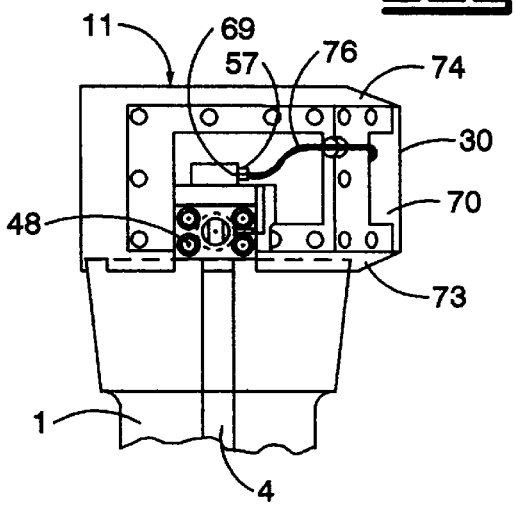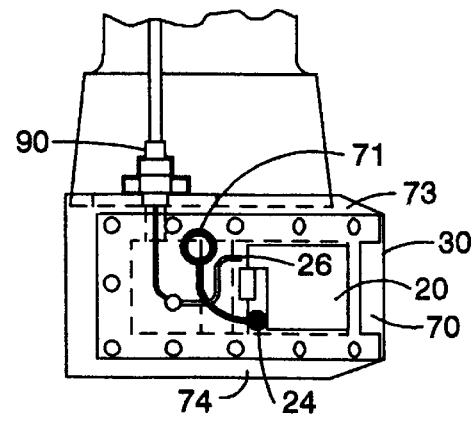

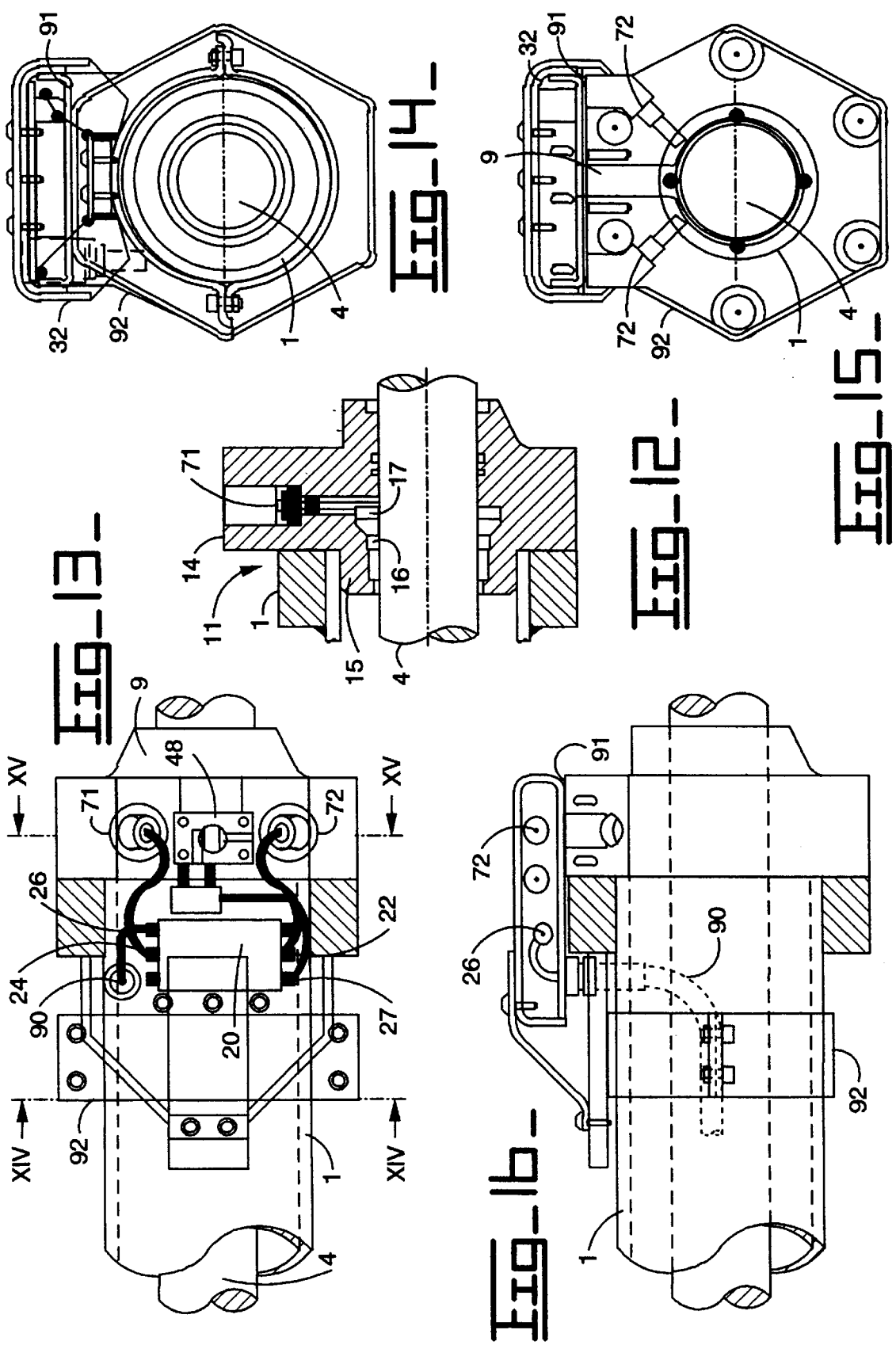

HYDRAULIC CYLINDER END MEMBER ARRANGEMENT FOR A PISTON POSITION SENSING SYSTEM

This application is based on the material disclosed in United States provisional patent application Ser. No. 60/034,825 filed Dec. 19, 1996.

TECHNICAL FIELD

The invention relates to sensing of the position of a piston in a hydraulic cylinder through the use of electromagnetic waves in the cylinder, and in particular to increased precision and reliability achieved through the relative, combined positioning of the electromagnetic signal couplers, and the signal processing electronics in the rod bearing head of a hydraulic cylinder.

BACKGROUND ART

Hydraulic cylinder piston and rod combinations are being increasingly used in many fields, a principal one of which involves the moving and positioning of material and objects. As the various applications of hydraulic cylinder piston and rod combinations have progressed, more stringent operational criteria are being encountered and systems are appearing in the art that precisely, reliably, and continuously sense the position of the piston and its related displacement parameters, velocity and acceleration, through correlation of resonances of electromagnetic waves in the cavity that is made up of the cylinder and the piston, with the dimensions of the cavity. In some such systems the wave performance is similar to that of an electrical transmission line with shorted ends, in that the resonance frequency of an electromagnetic standing wave correlates inversely with the cavity length.

In the hydraulic cylinder cavity, there is a high loss of a transmitted signal except at a resonance frequency corresponding to a piston position or cavity length where energy is coupled into a particular mode standing wave. At resonance, the amplitude rises sharply with frequency to a peak then declines. The frequency at resonance is lower when the cavity is longer and higher when the cavity is shorter. Correspondingly, the amplitude of each resonance will vary with the cavity length; the lower amplitudes being at the lower resonant frequency and the higher amplitudes being at the higher resonant frequency.

There are variations in position sensing systems in the art such as: injecting the electromagnetic signal into the cavity on the rod or on the head side of the piston; the excitation of particular mode standing waves; and the sensing of a harmonic other than the fundamental of a particular resonance frequency. As illustrations of progress in the art, in U.S. Pat. No. 4,737,705 a coaxial resonant cavity is employed within which the electromagnetic waves are launched and propagated in the mode referred to as the transverse electromagnetic wave (TEM) mode. The cylinder on the rod side of the piston is one type of coaxial cavity.

In U.S. Pat. No. 5,182,979, compensation through an equalization capability is provided for differences in losses as the extension of the piston and rod in the cylinder takes place.

In U.S. Pat. No. 5,325,063, identification of a fundamental resonance frequency is enhanced by the use of positive and negative slope intercepts of a resonance signal with respect to a reference level, where the positive slope is at the lower frequency and the negative slope is at the higher frequency.

In U.S. Pat. No. 5,617,034, an improved output signal is achieved by placing the input and output electromagnetic wave couplers at approximately 90 degree angular separation on the periphery of the hydraulic cylinder. Unwanted mode resonance is suppressed by positioning dummy couplers at further 90 degree positions.

In U.S. Pat. No. 5,608,332, increased sensitivity is achieved through the use of automatic gain refinement capability.

In U.S. Pat. No. 5,710,514, increased piston position accuracy is achieved by compensating for piston velocity in the determination of the piston position.

In copending application Ser. No. 08/799,280, filed concurrently herewith (Caterpillar File 94-453), increased piston position accuracy is achieved by compensating for changes in the dielectric properties of the hydraulic fluid in the piston position system.

The hydraulic cylinder piston and rod combinations may frequently be used in isolated and severe environmental conditions.

SUMMARY OF THE INVENTION

The invention provides an improvement in the sensitivity, accuracy and reliability of a piston position sensing system by electromagnetic wave coupling construction principles that position the couplers and fluid port that go into the cylinder and the electronic packaging, at the rod bearing head of the cylinder. The principles include a mechanical structure that supports the rod, provides an extension of the resonance cavity, supports electromagnetic wave couplers into the extended cavity and also may provide a piston travel stop and support a hydraulic fluid input-output port with a hydraulic fluid change monitoring and compensating device; an electronic circuitry shielded package having a high frequency section with coaxial shielded input and output conductors on opposing package sides and a lower frequency counting section having a piston position output shielded conductor and a fluid change input conductor separated from the high frequency section conductors; and the positioning of the electronic package on the mechanical structure with the coaxial shielded input and output conductors respectively adjacent to the input and output couplers.

The coupling of the invention assures greater options in the positioning of couplers and ports into the cylinder cavity together with minimal high frequency conductor length, with electrical and physical damage shielding.

BRIEF DESCRIPTION OF THE DRAWINGS

FIG. 1 is a depiction of the amplitude relationship of resonance frequency peaks to the length of a hydraulic cylinder cavity;

FIG. 2 is a cross sectional depiction of the structural principles of the rod supporting cylinder end member of the invention;

FIG. 3 is a top view illustrating the structural principles of the electronic package in the invention;

FIG. 4A is a side view of a cover employed with the package of FIG. 3 and the end element 11 shown in FIGS. 7–11;

FIG. 4B is a side view of a cover employed with the package of FIG. 3 and the end element 11 shown in FIGS. 12–16;

FIG. 5 is a schematic diagram of the fluid flow paths of a resonant cavity portion of an oscillator—resonant cavity hydraulic fluid change indicating device;

FIG. 6 is a circuit diagram of the oscillator portion of the device of FIG. 5;

FIGS. 7–16 are assembly views of the members and their relative positioning in first and second illustrative embodiments of the invention, in which:

FIG. 7 is a cross sectional type view of a first embodiment of the mechanical support cylinder end member of the invention;

FIG. 8 is a view along the line 8—8 of FIG. 7;

FIG. 9 is a top view of the cylinder end member oriented as in FIG. 8;

FIG. 10 is a right side view of the cylinder end member oriented as in FIG. 8;

FIG. 11 is a left side view of the cylinder end member oriented as in FIG. 8;

FIG. 12 is a cross sectional type view of a second embodiment of the mechanical support cylinder end member of the invention;

FIG. 13 is a top view of the member of FIG. 12 with the cover off exposing the relative component positioning;

FIG. 14 is an end view along the line 14—14 of FIG. 13;

FIG. 15 is an end view along the line 15—15 of FIG. 13; and

FIG. 16 is a side view of the mechanical support cylinder end member of FIG. 13.

DESCRIPTION OF THE INVENTION

The invention permits the coupling of electromagnetic wave frequency signals into and out of a hydraulic cylinder at the rod bearing head in order to enhance the sensitivity, accuracy and reliability of the frequency signals in piston position determination. In accordance with the invention, the rod bearing head of the cylinder is made as a thicker structure that will permit an extended cavity into which input and output couplers and a fluid ingress and egress port may be positioned and the electronics protected from the severe environment. This arrangement permits the present invention to be retrofit to standard hydraulic cylinder configurations primarily by replacement of the rod bearing head.

In the piston position determining system, a varying frequency signal is introduced into the cavity that is made up of the cylinder, the piston and the cylinder end, that covers the range of frequencies at which resonance of the cavity will take place over the range of piston travel. A frequency signal is sensed in the hydraulic fluid and is delivered to a signal receiver where information is extracted from the sensed frequency signal which, with compensation for hydraulic fluid dielectric property changes, permits identification of the position and motion parameters of the piston.

As the art has developed, it has been found that piston position sensing systems with the cavity on the rod side of the piston, signal introduction and receiving couplers positioned with 90 degree separation on the periphery of the cylinder, excitement in the TEM mode with sensing of the fundamental of the particular resonance frequency for the particular piston position or cavity length, and with compensation for dielectric property change of the hydraulic fluid, provides superior accuracy and reliability.

FIG. 1 illustrates a cross sectional view of the rod end of a hydraulic cylinder 1 in which a piston 2 moves in the cylinder 1 as shown by the double headed arrow 3. The rod 4 extends from the piston 2 through the cavity labeled 5 and through the supporting cylinder end 6 which is fastened, usually by a bolt circle not shown, to the end of the cylinder 1. The varying frequency electromagnetic waves are introduced and received through couplers of which one element 8 is visible. Compensation for changes in dielectric properties of the hydraulic fluid is usually monitored in connection with the input and exhaust of the cylinder fluid at port 9. One effect of the position of the couplers 8 and port 9 in the cylinder wall is that the available travel of the piston 2 would be reduced by a dimension "D". When electromagnetic waves are introduced through a coupler such as element 8 into the cavity 5, the resonance frequency peaks in amplitude and frequency as the input follows the frequency range, for example from 50 to 1800 megahertz, following the curve 10 in the dimensionally correlated graph in FIG. 1.

In accordance with the invention, the improved coupling, such as is illustrated in connection with FIGS. 2–4, minimizes the dimension "D" and maximizes sensitivity and reliability of the system by providing mechanical, electrical and positioning arrangement features. The structural support features provided in the rod supporting cylinder end 6 in effect extends the cavity 5, shields the input and receiving couplers 8 from piston travel, and establishes proximity support for high frequency electronics packaging with damage protecting cover thereover and hydraulic fluid dielectric property change compensation. The electronics packaging features are that internal circuitry is arranged; with high frequency input and receiving lead locations to and from the cylinder 1 positioned at separated locations on the package with minimum distances from the 90 degree separation input and receiving couplers for minimum transmission line distances, and, with lower frequency hydraulic fluid change compensation and piston position output signal transmission locations positioned at separated locations from the high frequency locations. The rod supporting cylinder end 6 structural features and the electronics packaging features are interrelated to structurally shield from physical damage, electrically minimize distances and shield for signal loss and insure dielectric property consistency and dielectric change monitoring so as together to improve reliability and precision.

The principles of the structural support features provided in the rod supporting cylinder end corresponding to element 6 of FIG. 1 are illustrated in FIG. 2 wherein like reference numerals are used where appropriate.

Referring to FIG. 2, the rod supporting cylinder end member 11 of the invention is removably fastened to the cylinder end 7 at a face 12, typically by means such as bolts, not shown, that pass through the end member 11 from fastener supporting faces 13, of which two are shown, that are essentially parallel to the face 12. A support region 14 of the end member 11 extends beyond the outside diameter of the cylinder 1 for structural support of the cylinder 1 and for damage shielding of the parts. The end element 11 may have a portion at face 12, not shown in this figure, extending into the cylinder 1 beyond the end 7, that serves for alignment purposes and as a stop for the piston 2, also not shown in this figure. A resonance cavity extension portion 16 is provided in which input and receiving couplers 17 of which one is shown dotted in this figure, can be mounted around the rod 4 which serves as a coaxial core member for the resonance cavity, and into which hydraulic fluid ingress and egress is made through port 9.

The principles of the electronic packaging features of the invention are illustrated in FIGS. 3 and 4. In FIG. 3, the circuitry located in package 20 is of such high frequency, as for example from 50 to 1800 MHz, that long signal lines affect performance. Physical damage shielding and hermetic encapsulation of the package 20 is needed because of the severe environment in which it is used. In accordance with the invention, the circuitry in the package 20 is partitioned into at least a partially rectangular package with an input section 21 containing a variable source of a high frequency signal containing a range of all the resonance frequencies to be encountered in the piston travel in FIG. 1 assembled adjacent to a coaxial external terminal 22 that is in turn to be connected to the input of the signal couplers 8 positioned with a 90 degree separation on the periphery of the cylinder.

The electronic circuitry is further partitioned to include a receiving section 23, containing circuitry capable of sensing resonance signals in the cylinder 1 delivered through a transmission line from a receiving coupler of the couplers 8 to a coaxial terminal 24 on the opposite side of the package 20. The general dimension of the package 20 is selected so that the distance between the terminals 22 and 24 is comparable to the 90 degree peripheral separation of the input and receiving couplers 8. The electronic circuitry is still further partitioned in the package 20 into a lower frequency section 25. The section 25 contains a controller integrated circuit that in turn contains a storage table of piston position information for comparison of detected resonance signal information. The piston position information in coded form is transmitted via a lower frequency coaxial channel at terminal 26. Another lower frequency coaxial channel labeled 27 with shield 28 receives hydraulic fluid dielectric property change information acquired through an oscillator to be described in connection with FIGS. 5 and 6 that is located at port 9 in support portion 14. The packaging features operate to position the electronic circuitry in the package 20 so as to provide minimal line distance to the input and receiving couplers 8.

Referring to FIGS. 4A and 4B, another feature of the end element 11 is support for a rugged cover to reduce physical damage such as could occur as a result of being struck by a stone. In FIG. 4B, the cover 30 is a metal member that would bridge two portions of the end element 11 and is attached by screws through holes 31 as would be encountered in the embodiment to be described in FIGS. 7–11.

In FIG. 4A, the cover 32 has a covering portion 33 with an inside region 34 illustrated by a dotted line into which package 20 fits with the portion 35 in contact with the support portion 14 of the end member 11.

In an apparatus that uses a hydraulic fluid, changes in the dielectric properties of the hydraulic fluid may affect the performance of the apparatus. In FIGS. 5 and 6, there is shown an oscillator mounted on a shoulder 14. The oscillator monitors the hydraulic fluid as it flows through port 9 and provides a signal indicating changes in the dielectric properties of the hydraulic fluid. The dimensions of the resonant cavity and the frequency of the oscillator are interrelated as a unit in that the oscillator sets up a resonance in the resonance cavity in a range of output frequency and changes in dielectric properties of the hydraulic fluid in the resonance cavity produce changes in the oscillator output frequency within that range.

FIG. 5 is a schematic diagram of the cavity and fluid flow pattern and FIG. 6 illustrates the circuitry. The cavity and fluid flow unit 40 includes a resonant cavity 41, typically with a diameter dimension "A" and a length dimension "B" which is filled with a hydraulic fluid and which may flow in both directions as depicted by the double headed arrow, as the hydraulic fluid goes in and out of the port 9 and is deflected by the baffles 42 and 43 which direct the fluid around branches 44 and 45 respectively into the cavity 41. A central conductor 46 is coaxially positioned in the resonant cavity 41.

An oscillator circuit 48, as shown in FIG. 6, transmits a high frequency signal through a terminal 49 and a capacitive coupler 50 into the fluid in the cavity 41 at a first location 51 along the central conductor 46 and at a second location 52 along the central conductor 46 separated by a dimension "C" from the first location 51. An inductive coupler 53 is connected through a terminal 54 to the oscillator circuitry 48. The portions of the oscillator in FIGS. 5 and 6 share a common ground 57.

The circuitry in FIG. 6 includes a bipolar transistor 55, having an emitter contact 56, a base contact 61, and a collector contact 62, resistors 58,63,65 capacitors 59,66,68, an inductor 60, and a Zener diode 64. A coaxial cable at terminal 69 provides DC power to the oscillator, upon which oscillator circuitry 48 superimposes an RF signal.

In operation the transistor 55 with the associated circuitry oscillates in a limited frequency range with changes in the dielectric properties of the fluid in the resonant cavity being the only source of frequency change within that range. Any change in the dielectric properties of fluid alter the frequency at the output 69 which is transmitted to the lower frequency coaxial terminal 27.

The oscillator of FIG. 6 is used where changes in dielectric constant caused by temperature, pressure, and contamination, such as lot to lot differences in hydraulic fluid, and air or other material entrained in the hydraulic fluid, can limit the precision of determining the position of the piston.

In FIGS. 7–16 there are provided multiple views of each of first and second illustrative embodiments of the principles of the invention. In the first illustrative embodiment of FIGS. 7–11, the rod bearing head member has a portion 15 extending into the cylinder. This trades off some of the piston travel gain in eliminating dimension "D" of FIG. 1, but acquires benefits in alignment and piston stop purposes. There is also a region 70, to be further described, into which the couplers and fluid ingress and egress port that extend into the extended cavity 16 can be positioned with protection from a severe environment and with ability to select position relative to each other around the periphery of the cylinder.

In the second illustrative embodiment of FIGS. 12–16, the rod bearing head member has a portion 15 extending into the cylinder. This trades off some of the piston travel gain in eliminating dimension "D" of FIG. 1, but acquires benefits in alignment and piston stop purposes. A platform 91, to be later described, is provided that supports an electronics package adjacent to the couplers and fluid ingress and egress port, that extend into the extended cavity 16.

Attachment of the rod bearing head 11 to the cylinder 1 may be accomplished in many ways including threads and bolts. The cylinder 1 is a large precisely manufactured object and flexibility in attachment to be compatible with different cylinder structures provides economic advantages. In the illustrative embodiments, the coupling is arranged for attaching the rod bearing head using different bolt circles.

There are a number of arrangements possible for the relative positioning of the couplers and fluid ingress and egress port around the periphery of the cylinder 1. In the illustrative embodiments of FIGS. 7–16, the different structural features permit flexibility in placement relative to each other of such components. The first embodiment involves FIGS. 7–11. The reference numerals of FIGS. 1–6 are used as appropriate.

In FIG. 7 the end member 11 is constructed with a region 70 in the support region 14 that permits: the input 71 and receiving 72 couplers, corresponding to element 8 of FIG. 2, of which only the input coupler 71 with antenna 17 in cavity extension 16 is seen in this view, the electronics packaging 20 of FIG. 3 and the interconnecting conductors to be placed between the portions 73 and 74 of the support region 14 with all items in the region 70 being covered by a cover 30 of the type shown in FIG. 4B.

FIG. 8 illustrates a view of the end member 11 of FIG. 7 along the line 8—8. In this first embodiment as depicted in FIG. 8, the exposed 90 degree angular positioned terminals of the input 71 and receiving 72 couplers that correspond to the coupler 8 of FIG. 2 are visible. The couplers 71 and 72 are each connected to a coupler antenna element 17 in the cavity extension 16, also visible in FIG. 2. The couplers 71 and 72 are positioned with a 90 degree peripheral separation in the cavity with a dummy antenna further positioned an additional 90 degree separation from each, so that four fold resonance symmetry is achieved around the rod which serves as a coaxial core.

The electronics package 20 of FIG. 3 is positioned in the region 70 under the cover 30 so that the coaxial terminal 22 is adjacent to the exposed terminal of the input coupler 72 and the coaxial terminal 24 is adjacent to the exposed terminal of the receiving coupler 71, with essentially equal minimal electrical transmission line distances. The hydraulic fluid dielectric property change monitoring and compensation oscillator 40,48 of FIGS. 5 and 6 with the port 9 ingress and egress (not visible) that permits fluid flow into and out of the extended cavity 16. A shielded conductor line 76 extends in the region 70 from terminals 57 and 69 of the oscillator 40, 48 to terminals 27 and 28 of the package 20.

In FIGS. 9, 10, and 11 there are further views of the electronic wiring in the region 70. FIG. 9 is a top view of the cylinder 1 and the end member 11 oriented as in FIG. 8; and FIG. 10 is a left side view of the cylinder 1 and the end member 11 oriented as in FIG. 9. In each of the different views of FIGS. 9 and 10, the apparatus for the dielectric change monitoring and compensation of the hydraulic fluid is shown including the oscillator 48, connections 57,69 through conductor 76 to the terminal 27. FIG. 11 is a right side view of the cylinder 1 and the end member 11 oriented as in FIG. 9. In FIG. 11 there is illustrated the positioning of the electronics package 20 with the short high frequency transmission line distance from the terminal 24 to the coupler 71 and the output 90 connected to the terminal 26.

The second embodiment involves FIGS. 12–16, wherein the reference numerals of the previous figures are used in the later figures as appropriate, which will be discussed in order. In FIGS. 12–16: FIG. 12 is a cross sectional type view of the mechanical support cylinder end member of the invention, FIG. 13 is a top view of the member FIG. 12 with the cover off exposing the relative component positioning, FIG. 14 is an end view along the line 14–14 of FIG. 13, FIG. 15 is an end view along the line 15–15 of FIG. 13, and, FIG. 16 is a side view of the mechanical support cylinder end member of FIG. 13.

Referring to FIGS. 12–16, in the second embodiment, the end member 11 is constructed with the support region 14 arranged to support, on a platform 91 attached to it, the electronics package 20, with short high frequency transmission line conductor distances to the 90 degree peripherally separated couplers 71 and 72. An advantage of the second embodiment, referring to FIG. 15, is that the short high frequency transmission line distances are preserved.

In FIGS. 13–16, the support 92 for the platform 91 and cover 32 which is fastened around the cylinder 1 is illustrated. In FIGS. 13 and 16 the output conductor 90 is coupled to terminal 26. In FIG. 12 the couplers 17 and the coupler probes such as 71 may be separate pieces that electrically connect in the extended cavity 16.

Other aspects, objects, and advantages of this invention can be obtained from a study of the drawings, the disclosure, and the appended claims.

What is claimed is:

1. In a hydraulic cylinder piston position sensing system employing high frequency electromagnetic waves in the hydraulic fluid filled cavity on the rod side of a cylinder, the improvement comprising:

an end member supporting a piston rod and positioned in contact with the end of said cylinder, said end member having a portion that provides an extension for said fluid filled cavity surrounding said rod;

at least three physical damage protected ports for receiving signal input and receiving couplers and accommodating hydraulic fluid ingress and egress into said extension of said cavity;

damage protected support means at a position proximate to said ports for support of packaged circuitry involving said high frequency electromagnetic waves; and a partitioned electronic circuitry package at least having high frequency input and receiving sections each with a terminal on an opposite side of said package, said package being positioned on said end member to minimize conductor length between each said high frequency input and receiving terminal and an adjacent one of said ports for signal input and receiving couplers.

2. The improvement of claim 1 wherein said damage protected support means includes a structurally rugged cover.

3. In a hydraulic cylinder piston position sensing system employing high frequency electromagnetic waves in the hydraulic fluid filled cavity on the rod side of the cylinder, the improvement comprising: an end member that surrounds and supports a piston rod, said end member being removably fastened to the end of said cylinder, said end member at said end of said cylinder having a portion that defines a space surrounding said rod that serves as an extension of said cavity, said end member having first and second signal coupler ports each extending through said end and into said extension of said cavity and positioned with about ninety degree separation on the periphery of said cylinder, said end member having a hydraulic fluid ingress and egress port extending through said end and into said extension of said cavity, and, said end member providing damage protected support for electronic packaging in the vicinity of said ports.

4. The end member of claim 3, wherein said damage protected support includes a rugged cover.

5. The end member of claim 3, wherein said damage protected support is provided by a recessed region between first and second solid portions of said end member, at least said signal coupler ports and said electronic packaging being located under a cover.

6. The end member of claim 3, wherein said damage protected support is a platform region adjacent to said hydraulic fluid ingress and egress port that in turn is positioned between said signal coupler ports with said electronic packaging, located under a cover.

7. A hydraulic cylinder piston position sensing system in the cavity on the rod side of the cylinder, comprising:

input and receiving signal coupler ports extending into an extension of said cavity through a rod supporting head attached to the end of said cylinder; and electronic circuitry for providing an indication of piston position in a hermetic package having high frequency input and receiving sections between opposing sides with lower frequency circuitry in at least a part of the remainder of said package, said circuitry being positioned substantially between said ports of said rod supporting head, and having signal couplers within said ports for transmitting and receiving radio frequency signals to and from said extension of said cavity.

8. A hydraulic cylinder piston position sensing system employing electromagnetic waves in the hydraulic fluid filled cavity on the rod side of the cylinder, comprising in combination:

an end member that surrounds and supports a piston rod, said end member being removably fastened to the end of said cylinder at a first face, said end member having a portion extending into said cylinder, said portion being separated from said rod by a space surrounding said rod that defines an extension of said cavity, said portion further extending into said cylinder to a second face that defines a piston stop in said cylinder, said end member having:

first and second signal coupler ports extending into said extension of said cavity and separately positioned on the periphery of said end member;

a hydraulic fluid ingress and egress port through said end member into said extension of said cavity; and an electronic circuitry shielded package positioned on said end member proximate said signal coupler ports and having at least input and receiving high frequency sections each with a terminal on an opposing side of said package.

9. The sensing system of claim 8, wherein said coupler port separation is essentially 90 degrees.

10. Apparatus for sensing the position of a piston in a hydraulic cylinder, comprising in combination:

a hydraulic cylinder with means for introducing and sensing high frequency electromagnetic waves in the hydraulic fluid filled cavity on the rod side of said cylinder;

an end member that surrounds and supports a piston rod, said end member being removably fastened to the end of said cylinder at a first face and having a portion extending into said cylinder separated from said rod by a space surrounding said rod that defines an extension of said cavity, said portion further extending into said cylinder to a second face that defines a piston stop in said cylinder, said end member having first and second signal coupler ports each extending into said extension of said cavity, said end member having a hydraulic fluid ingress and egress port extending into said extended cavity; and an electronic circuitry shielded package positioned in a damage protecting location on said end member and having at least input and receiving high frequency sections each with a terminal on an opposing side of the package, and with lower frequency circuitry in at least a part of the remainder of said package.

11. The process of coupling electromagnetic wave signals in a hydraulic cylinder piston position sensing system, comprising in combination the steps of:

providing a hydraulic cylinder with means for introducing and sensing high frequency electromagnetic waves in the hydraulic fluid filled cavity on the rod side of said cylinder; and fastening an end member on the rod end of said cylinder that surrounds and supports a piston rod, said end member being removably fastened to the end of said cylinder at a first face and having a portion separated from said rod by a space surrounding said rod that defines an extension of said cavity, said end member having first and second signal coupler ports each extending into said cavity and positioned with separation on the periphery of said cylinder, said end member having a hydraulic fluid ingress and egress port extending into said extension of said cavity, and said end member providing damage protected support for electronic packaging in the vicinity of each said port.

12. The process of claim 11, further including the steps of:

partitioning electronic circuitry in a shielded package into at least input and receiving high frequency sections;

providing each of said sections with a terminal on an opposing side of said package;

providing lower frequency circuitry in at least a part of the remainder of said package; and positioning said electronic circuitry on said end member with said opposing side terminals each adjacent to one of said signal coupler ports.

13. The process of claim 12, wherein there is provided on said end member a portion extending into said cylinder.

* * * * *